United States Patent
Datta et al.

(10) Patent No.: US 12,536,989 B2
(45) Date of Patent: Jan. 27, 2026

(54) LANGUAGE-AGNOSTIC MULTILINGUAL MODELING USING EFFECTIVE SCRIPT NORMALIZATION

(71) Applicant: Google LLC, Mountain View, CA (US)

(72) Inventors: Arindrima Datta, New York, NY (US); Bhuvana Ramabhadran, Mt. Kisco, NY (US); Jesse Emond, Mountain View, CA (US); Brian Roark, Mountain View, CA (US)

(73) Assignee: Google LLC, Mountain View, CA (US)

( * ) Notice: Subject to any disclaimer, the term of this patent is extended or adjusted under 35 U.S.C. 154(b) by 301 days.

(21) Appl. No.: 18/187,330

(22) Filed: Mar. 21, 2023

(65) Prior Publication Data

US 2023/0223009 A1   Jul. 13, 2023

Related U.S. Application Data

(63) Continuation of application No. 17/152,760, filed on Jan. 19, 2021, now Pat. No. 11,615,779.

(Continued)

(51) Int. Cl.
*G10L 15/00* (2013.01)
*G06F 40/58* (2020.01)
(Continued)

(52) U.S. Cl.
CPC ............ *G10L 15/005* (2013.01); *G06F 40/58* (2020.01); *G06N 3/049* (2013.01); *G10L 15/063* (2013.01); *G10L 15/16* (2013.01); *G10L 15/26* (2013.01)

(58) Field of Classification Search
CPC ..... G10L 15/005; G10L 15/063; G10L 15/16; G10L 15/26; G06F 40/58; G06F 40/129;
(Continued)

(56) References Cited

U.S. PATENT DOCUMENTS 10,832,668 B1 * 11/2020 Devries ................. G10L 15/22
10,872,599 B1   12/2020 Wu et al.
(Continued)

OTHER PUBLICATIONS

J. Emond et al., "Transliteration Based Approaches to Improve Code-Switched Speech Recognition Performance," 2018 IEEE Spoken Language Technology Workshop (SLT), 2018, pp. 448-455, doi: 10.1109/SLT.2018.8639699 (https://ieeexplore.ieee.org/document/8639699; Emond et al.) (Year: 2018).*

(Continued)

*Primary Examiner* — Pierre Louis Desir
*Assistant Examiner* — Keisha Y. Castillo-Torres
(74) *Attorney, Agent, or Firm* — Honigman LLP; Brett A. Krueger; Grant Griffith

(57) ABSTRACT

A method includes obtaining a plurality of training data sets each associated with a respective native language and includes a plurality of respective training data samples. For each respective training data sample of each training data set in the respective native language, the method includes transliterating the corresponding transcription in the respective native script into corresponding transliterated text representing the respective native language of the corresponding audio in a target script and associating the corresponding transliterated text in the target script with the corresponding audio in the respective native language to generate a respective normalized training data sample. The method also includes training, using the normalized training data samples, a multilingual end-to-end speech recognition model to predict speech recognition results in the target script for corresponding speech utterances spoken in any of the different native languages associated with the plurality of training data sets.

20 Claims, 7 Drawing Sheets

Related U.S. Application Data

(60) Provisional application No. 62/966,779, filed on Jan. 28, 2020.

(51) Int. Cl.
*G06N 3/049* (2023.01)
*G10L 15/06* (2013.01)
*G10L 15/16* (2006.01)
*G10L 15/26* (2006.01)

(58) Field of Classification Search
CPC ........ G06F 40/53; G06N 3/049; G06N 3/044; G06N 3/084
See application file for complete search history.

(56) References Cited

U.S. PATENT DOCUMENTS

| | | | |
|---|---|---|---|
| 10,964,309 B2 * | 3/2021 | Li | G06N 3/044 |
| 11,238,854 B2 * | 2/2022 | Aggarwal | G10L 15/22 |
| 2017/0148433 A1 * | 5/2017 | Catanzaro | G10L 25/18 |
| 2019/0189111 A1 | 6/2019 | Watanabe et al. | |
| 2019/0214134 A1 | 7/2019 | Bates | |
| 2019/0348041 A1 | 11/2019 | Cella et al. | |
| 2020/0160836 A1 * | 5/2020 | Chen | G10L 15/063 |
| 2022/0122579 A1 * | 4/2022 | Biadsy | G10L 21/003 |
| 2022/0147791 A1 * | 5/2022 | Yao | G06N 3/0495 |

OTHER PUBLICATIONS

Saravanan, K., and A. Kumaran. "Some experiments in mining named entity transliteration pairs from comparable corpora." Proceedings of the 2nd workshop on Cross Lingual Information Access (CLIA) Addressing the Information Need of Multilingual Societies. 2008. (https://aclanthology.org/I08-6004.pdf) (Year: 2008).*

Zhou, Shiyu, Shuang Xu, and Bo Xu. "Multilingual end-to-end speech recognition with a single transformer on low-resource languages." arXiv preprint arXiv:1806.05059 (2018) (https://arxiv.org/abs/1806.05059; Zhou et al.). (Year: 2018).*

Ma et al., "Comparison of Data Augmentation and Adaptation Strategies for Code-switched Automatic Speech Recognition," May 12, 2019, 5 pages (https://ieeexplore.ieee.org/stamp/stamp.jsp?tp=&arnumber=8682824) (Year: 2019).*

International Search Report, PCT/US2021/014024, Dated Apr. 12, 2021, 15 pages.

Datta et al., "Language-Agnostic Multilingual Modeling," May 4, 2020, 5 pages.

Ma et al., "Comparison of Data Augmentation and Adaptation Strategies for Code-switched Automatic Speech Recognition," May 12, 2019, 5 pages.

Emond et al., "Transliteration Based Approaches to Improve Code-Switched Speech Recognition Performance," Dec. 18, 2018, 8 pages.

Kannan et al. "Large-Scale Multilingual Speech Recognition with a Streaming End-to-End Model," Dated Sep. 11, 2019, 5 pages.

USPTO. Office Action relating to U.S. Appl. No. 17/152,760, dated Aug. 3, 2022.

Graves, Alex. "Sequence transduction with recurrent neural networks." arXiv preprint arXiv:1211.3711 (2012) (<https://arxiv.org/pdf/> 1211.3711.pdf; Graves). (Year: 2012).

Lu, Liang, et al. "Segmental recurrent neural networks for end-to-end speech recognition." arXiv preprint arXiv:1603.00223 (2016). <https:/arxiv.org/pdf/1603.00223.pdf;> Lu et al.). (Year: 2016).

Alexandre Klementiev and Dan Roth "Named Entity Transliteration and Discovery from Multilingual Comparable Corpora", in HLTNAACL 2006 (<https://aclanthology.org/N06-1011.pdf;> Klementiev et al.). (Year: 2006).

Saravanan, K., and A. Kumaran. "Some experiments in mining named entity transliteration pairs from comparable corpora." Proceedings of the 2nd workshop on Cross Lingual Information Access (CLIA) Addressing the Information Need of Multilingual Societies. 2008. (<https://aclanthology.org/I08-6004.pdf)> (Year: 2008).

* cited by examiner

Illustration of transliteration between Devanagari and Latin scripts for the English word *browser*

LANGUAGE-AGNOSTIC MULTILINGUAL MODELING USING EFFECTIVE SCRIPT NORMALIZATION

CROSS REFERENCE TO RELATED APPLICATIONS

This U.S. patent application is a continuation of, and claims priority under 35 U.S.C. § 120 from, U.S. patent application Ser. No. 17/152,760, filed on Jan. 19, 2021, which claims priority under 35 U.S.C. § 119 (e) to U.S. Provisional Application 62/966,779, filed on Jan. 28, 2020. The disclosures of these prior applications are considered part of the disclosure of this application and are hereby incorporated by reference in their entireties.

TECHNICAL FIELD

This disclosure relates to language-agnostic multilingual modeling using effective script normalization.

BACKGROUND

Automated speech recognition (ASR) systems that can transcribe speech in multiple languages, which are referred to as multilingual ASR systems, have gained popularity as an effective way to expand ASR coverage of the world's languages. Through shared learning of model elements across different languages, conventional multilingual ASR systems have been shown to outperform monolingual ASR systems, particularly for those languages where less training data is available.

Conventional multilingual ASR systems can be implemented using a significantly simplified infrastructure, owing to the fact that multiple natural languages can be supported with just a single speech model rather than with multiple individual models. In most state-of-the-art multilingual ASR systems, however, only the acoustic model (AM) is actually multilingual, and separate, language-specific language models (LMs) and their associated lexicons are still required.

Recently, end-to-end (E2E) models have shown great promise for ASR, exhibiting improved word error rates (WERs) and latency metrics as compared to conventional on-device ASR systems. These E2E models, which fold the AM, pronunciation model (PM), and LMs into a single network to directly learn speech-to-text mapping, have shown competitive results compared to conventional ASR systems which have a separate AM, PM, and LMs. Representative E2E models include word-based connectionist temporal classification (CTC) models, recurrent neural network transducer (RNN-T) models, and attention-based models such as Listen, Attend, and Spell (LAS).

While conditioning multilingual E2E models on language information allows the model to track languages switches within an utterance, adjust language sampling rations, and/or add additional parameters based on a training data distribution, the dependency on language information limits the ability of multilingual E2E models to be extended to newer languages. Moreover, for speaking styles where code-switching is common, such as in Indic languages for example, variability in an amount of usage of a secondary language (e.g., English) alongside the primary native language (e.g., Tamil, Bengali, Kannada, or Hindi), the dependency of conditioning the model on language information also makes it difficult to model the context under which code switching occurs, and the language to which a spoken word should be assigned.

SUMMARY

One aspect of the disclosure provides a computer-implemented method for training a multilingual end-to-end (E2E) speech recognition model. The computer-implemented method, when executed on data processing hardware, causes the data processing hardware to perform operations that include obtaining a plurality of training data sets each associated with a respective native language that is different than the respective native language of the other training data sets. Each training data set includes a plurality of respective training data samples that each include audio spoken in the respective native language and a corresponding transcription of the audio in a respective native script representing the respective native language. For each respective training data sample of each training data set in the respective native language, the operations also include transliterating the corresponding transcription in the respective native script into corresponding transliterated text representing the respective native language of the corresponding audio in a target script, and associating the corresponding transliterated text in the target script with the corresponding audio in the respective native language to generate a respective normalized training data sample. The respective normalized training data sample includes the audio spoken in the respective native language and the corresponding transliterated text in the target script. The operations also include training, using the normalized training data samples generated from each respective training data sample of each training data set and without providing any language information, the multilingual E2E speech recognition model to predict speech recognition results in the target script for corresponding speech utterances spoken in any of the different native languages associated with the plurality of training data sets.

Implementations of the disclosure may include one or more of the following optional features. In some implementations, transliterating the corresponding transcription in the respective native script into the corresponding transliterated text includes using a respective transliteration transducer associated with the respective native script to transliterate the corresponding transcription in the respective native script into the corresponding transliterated text in the target script. The transliteration transducer associated with the respective native script may include: an input transducer configured to input Unicode symbols in the respective native script to symbols in a pair language model; a bigram pair language model transducer configured to map between symbols in the respective native script and the target script; and an output transducer configured to map the symbols in the pair language model to output symbols in the target script. In these implementations, the operations may also include, prior to transliterating the corresponding transcription in the respective native language, training, using agreement-based data pre-processing, each respective transliteration transducer to only process transliteration pairs that have at least one spelling in the target script of the transliterated text for a given native word that is common across each of the respective native languages associated with the training data sets. Alternatively, the operations may optionally include, prior to transliterating the corresponding transcription in the respective native language, training, using frequency-based data pre-processing, each respective transliteration transducer to only process transliteration pairs that have spellings in the target script of the transliterated text for a given native word that satisfy a frequency threshold.

In other implementations, transliterating the corresponding transcription in the respective native script into the corresponding transliterated text includes either using a finite state transducer (FST) network to transliterate the corresponding transcription in the respective native script into the corresponding transliterated text, or using a language-independent transliteration transducer to transliterate the corresponding transcription in the respective native script into the corresponding transliterated text in the target script. The multilingual E2E speech recognition model may include a sequence-to-sequence neural network. For instance, the multilingual E2E speech recognition model may include a recurrent neural network transducer (RNN-T).

In some examples, training the multilingual E2E speech recognition model includes using a stochastic optimization algorithm to train the multilingual E2E speech recognition model. The operations may also include, prior to training the multilingual E2E ASR model, shuffling the normalized training data samples generated from each respective training data sample of each training data set. In some implementations, the operations also include, after training the multilingual E2E ASR model, pushing the trained multilingual E2E ASR model to a plurality of user devices, each user device configured to: capture, using at least one microphone in communication with the user device, an utterance spoken by a respective user of the user device in any combination of the respective native languages associated with the training data sets; and generate, using the trained multilingual E2E ASR model, a corresponding speech recognition result in the target script for the captured utterance spoken by the respective user. In these implementations, at least one of the plurality of user devices may be further configured to transliterate the corresponding speech recognition result in the target script into a transliterated script.

Another aspect of the disclosure provides a system for training a multilingual end-to-end (E2E) speech recognition system. The system includes data processing hardware of a user device and memory hardware in communication with the data processing hardware and storing instructions that when executed by the data processing hardware cause the data processing hardware to perform operations that include obtaining a plurality of training data sets each associated with a respective native language that is different than the respective native language of the other training data sets. Each training data set includes a plurality of respective training data samples that each include audio spoken in the respective native language and a corresponding transcription of the audio in a respective native script representing the respective native language. For each respective training data sample of each training data set in the respective native language, the operations also include transliterating the corresponding transcription in the respective native script into corresponding transliterated text representing the respective native language of the corresponding audio in a target script, and associating the corresponding transliterated text in the target script with the corresponding audio in the respective native language to generate a respective normalized training data sample. The respective normalized training data sample includes the audio spoken in the respective native language and the corresponding transliterated text in the target script. The operations also include training, using the normalized training data samples generated from each respective training data sample of each training data set and without providing any language information, the multilingual E2E speech recognition model to predict speech recognition results in the target script for corresponding speech utterances spoken in any of the different native languages associated with the plurality of training data sets.

This aspect of the disclosure may include one or more of the following optional features. In some implementations, transliterating the corresponding transcription in the respective native script into the corresponding transliterated text includes using a respective transliteration transducer associated with the respective native script to transliterate the corresponding transcription in the respective native script into the corresponding transliterated text in the target script. The transliteration transducer associated with the respective native script may include: an input transducer configured to input Unicode symbols in the respective native script to symbols in a pair language model; a bigram pair language model transducer configured to map between symbols in the respective native script and the target script; and an output transducer configured to map the symbols in the pair language model to output symbols in the target script. In these implementations, the operations may also include, prior to transliterating the corresponding transcription in the respective native language, training, using agreement-based data pre-processing, each respective transliteration transducer to only process transliteration pairs that have at least one spelling in the target script of the transliterated text for a given native word that is common across each of the respective native languages associated with the training data sets. Alternatively, the operations may optionally include, prior to transliterating the corresponding transcription in the respective native language, training, using frequency-based data pre-processing, each respective transliteration transducer to only process transliteration pairs that have spellings in the target script of the transliterated text for a given native word that satisfy a frequency threshold.

In other implementations, transliterating the corresponding transcription in the respective native script into the corresponding transliterated text includes either using a finite state transducer (FST) network to transliterate the corresponding transcription in the respective native script into the corresponding transliterated text, or using a language-independent transliteration transducer to transliterate the corresponding transcription in the respective native script into the corresponding transliterated text in the target script. The multilingual E2E speech recognition model may include a sequence-to-sequence neural network. For instance, the multilingual E2E speech recognition model may include a recurrent neural network transducer (RNN-T).

In some examples, training the multilingual E2E speech recognition model includes using a stochastic optimization algorithm to train the multilingual E2E speech recognition model. The operations may also include, prior to training the multilingual E2E ASR model, shuffling the normalized training data samples generated from each respective training data sample of each training data set. In some implementations, the operations also include, after training the multilingual E2E ASR model, pushing the trained multilingual E2E ASR model to a plurality of user devices, each user device configured to: capture, using at least one microphone in communication with the user device, an utterance spoken by a respective user of the user device in any combination of the respective native languages associated with the training data sets; and generate, using the trained multilingual E2E ASR model, a corresponding speech recognition result in the target script for the captured utterance spoken by the respective user. In these implementations, at least one of the plurality of user devices may be further configured to transliterate the corresponding speech recognition result in the target script into a transliterated script.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
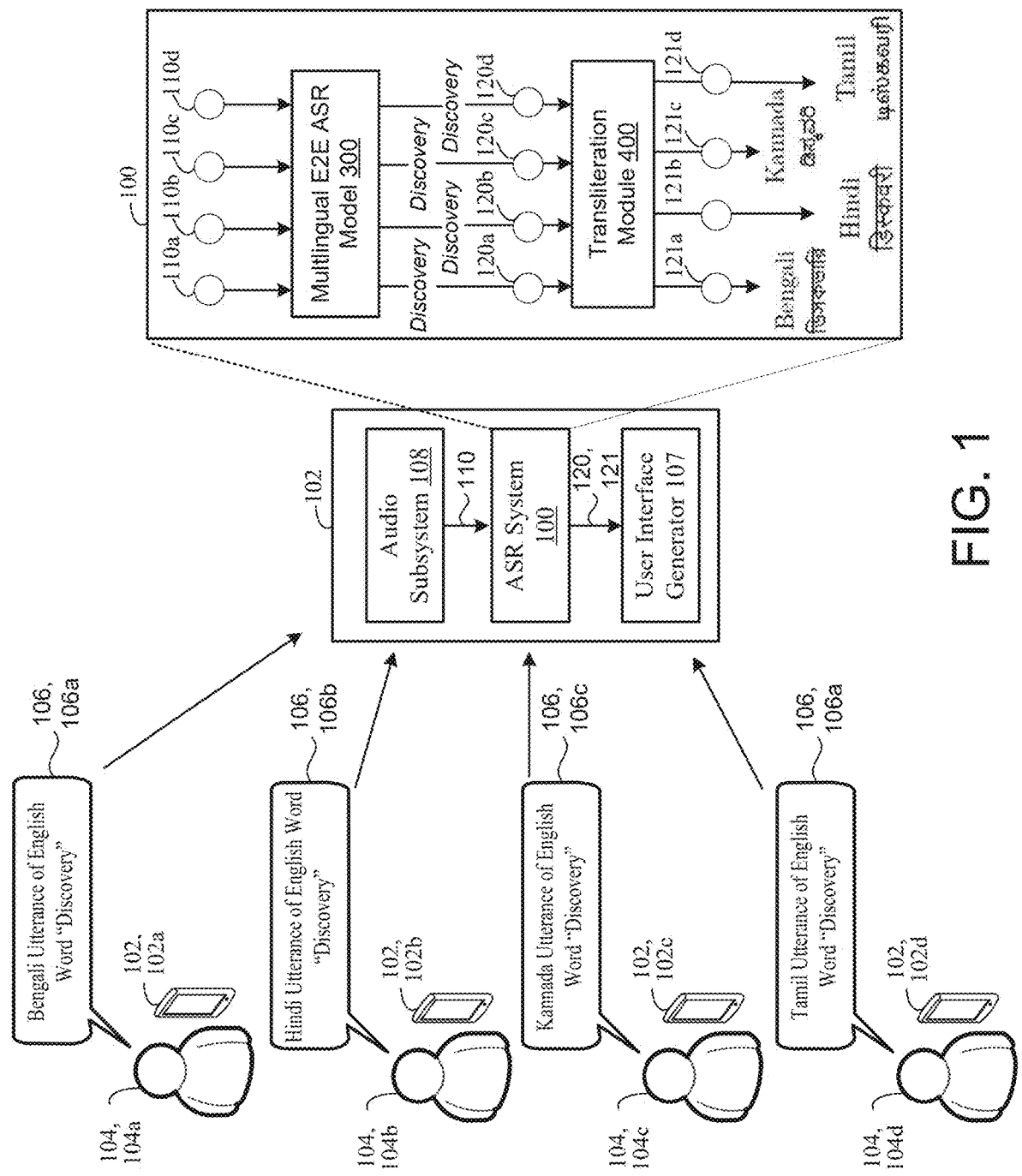
FIG. 1 is a schematic view of an example language-agnostic, multilingual speech recognition system.

FIG. 1 illustrates an automated speech recognition (ASR) system 100 implementing a language-agnostic, end-to-end (E2E) ASR model 300 that resides on user devices 102, 102a-d of various Indic-speaking users 104, 104a-d. Specifically, the user 104a of the user device 102a speaks Bengali as his/her respective native language, the user 104b of the second user device 102b speaks Hindi as his/her respective native language, the user 104c of the user device 102c speaks Kannada as his/her respective native language, and the user 104d of the user device 102d speaks Tamil has his/her respective native language. While the example shown depicts the ASR system 100 residing on a user device 102, some or all components of the ASR system 100 may reside on a remote computing device (e.g., one or more servers of a distributed system executing in a cloud-computing environment) in communication with the user device 102. Moreover, other users 104 may speak other Indic languages or languages of other dialects such as, without limitation, English, French, Spanish, Chinese, German, and/or Japanese. Although the user devices 102 are depicted as mobile phones, the user devices 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device.

Each of the user devices 102 include an audio subsystem 108 configured to receive utterances 106 spoken by the users 104 (e.g., the user devices 102 may include one or more microphones for recording the spoken utterances 106) in their respective native languages and convert the utterances 106 into a corresponding digital format associated with input acoustic frames 110 capable of being processed by the ASR system 100. In the example shown, each user 104 speaks a respective utterance 106, 106a-d in the respective native language of the English word "Discovery" and the audio subsystem 108 converts each utterance 106, 106a-d into corresponding acoustic frames 110, 110a-d for input to the ASR system 100. Here, the acoustic frames 110a are associated with audio spoken in the respective native language of Bengali, the acoustic frames 110b are associated with audio spoken in the respective native language of Hindi, the acoustic frames 110c are associated with audio spoken in the respective native language of Kannada, and the acoustic frames 110d are associated with audio spoken in the respective native language of Tamil. Thereafter, the multilingual E2E ASR model 300 receives, as input, the acoustic frames 110 corresponding to each utterance 106, and generates/predicts, as output, a corresponding transcription (e.g., recognition result) 120 of the utterance 106 in a target script. Thus, each corresponding transcription 120 represents the respective native language of the corresponding utterance/audio 106 in the same target script. As used herein, the term "script" generally refers to a writing system that includes a system of symbols that are used to represent a natural language. Example scripts include Latin, Cyrillic, Greek, Arabic, Indic, or any another writing system. In the example shown, the target script includes Latin such that each corresponding recognition result 120a, 120b, 120c, 120d represents the respective native language of the corresponding utterance 106a, 106b, 106c, 106d in the same target script of Latin. Therefore, while each user 104 speaks the utterance 106 of the English word "Discovery" in the respective native language including respective ones of Bengali, Hindi, Kannada, and Tamil, the multilingual E2E ASR model 300 is configured to generate/predict corresponding speech recognition results 120 in the same target script of Latin such that each recognition result 120a, 120b, 120c, 120d is in the same target script of Latin, e.g., "Discovery". In some examples, one or more users 104 speak codemixed utterances 106 that include codemixing of words in their respective native language as well as a secondary language such as English, another Indic language, or some other natural language. IN these examples, for each codemixed utterance 106 received, the ASR model 300 will similarly generate/predict a corresponding speech recognition result in the same target script, e.g., Latin.

In some configurations, the ASR system 100 optionally includes a transliteration module 400 configured to transliterate the speech recognition result 120 output from the multilingual E2E ASR model 300 in the target script into any suitable transliterated script 121. For instance, the transliteration module 400 may transliterate each of: the speech recognition result 120a associated with the Bengali-speaking user 104a from the Latin target script into Bengali script 121a; the speech recognition result 120b associated with the Hindi-speaking user 104b from the Latin target script into Hindi script 121b; the speech recognition result 120c associated with the Kannada-speaking user 104c from the Latin target script into Kannada script 121c; and the speech recognition result 120d associated with the Tamil-speaking user 104d from the Latin target script into Tamil script 121d. The transliteration module 400 may use finite state transducer (FST) networks to perform the transliteration.

In the example shown, the user devices 102 also execute a user interface generator 107 configured to present a representation of the speech recognition results 120, 121 of the ASR system 100 to the respective users 104 of the user device 102. In some configurations, the speech recognition result 120 in the target script and/or in the transliterated script 121 output from ASR system 100 is processed, e.g., by a natural language understanding (NLU) module executing on the user device 102 or a remote device, to execute a user command. In one example, the transliteration module 400 transliterates the speech recognition result 120 in the target script associated with a first user 104a that speaks a first respective native language (e.g., Bengali) into transliterated script 121 representing a second different respective native language (e.g., Hindi) spoken by a second user 104a. In this example, the transliterated script 121 may represent the second respective native language spoken by the second user 104b for an audible utterance 106a spoken by the first user 104a in the first respective native language. Here, the user interface generator 107 on the second user device 102b may present the transliterated script 121 to the second user 104. Additionally or alternatively, a text-to-speech system (e.g., executing on any combination of the first user device 104a, the second user device 102b, or a remote system) may convert the transliterated script 121 into synthesized speech for audible output by the second user device 102b in the second respective native language (e.g., Hindi) spoken by the second user 104b.

When the ASR system 100 includes the transliteration module 400, the language of the transliterated script may be based on the native language associated with the user that provided the corresponding utterance 106 or the native language associated with a recipient user 104b that speaks a different native language than the native language in which the original utterance 106 was spoken. There are a number of ways to determine the language of the transliterated script 121. For instance, a user's language preference may be set explicitly by the user when executing a speech recognition program on their user device. Likewise, the user providing the utterance may explicitly set/input the native language of the recipient user in the context of language translation. In additional examples, the user's language preference may be based on a geographical region in which the user device 102 is located. Alternatively, a language identification system may identify the language of the originating utterance on a per utterance basis so that the speech recognition result in the target script can be transliterated back to the originating language spoken by the user of the utterance.

Figure 3:
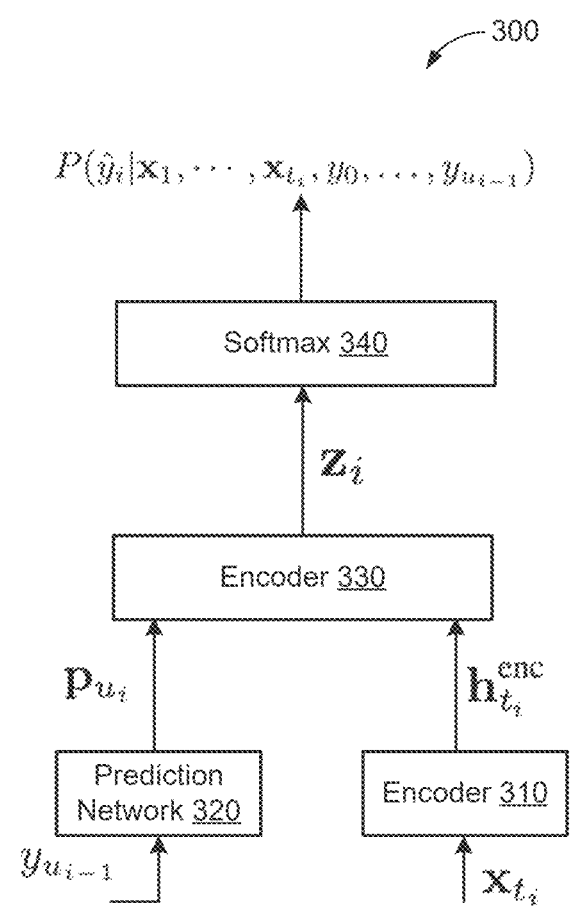
FIG. 3 is an example recurrent neural network transducer (RNN-T) architecture.

The multilingual E2E ASR model 300 may implement any type of sequence-to-sequence neural network architecture. For instance, the multilingual E2E ASR model 300 implements a Listen, Attend, Spell (LAS) neural network architecture. In some implementations, the multilingual E2E ASR model 300 uses a Recurrent Neural Network-Transducer (RNN-T) model architecture which adheres to the latency constraints associated with interactive applications. Referring to FIG. 3, an example multilingual E2E ASR model 300 includes an encoder network 310, a prediction network 320, and a joint network 330. The encoder network 310, which is roughly analogous to an acoustic model (AM) in a traditional ASR system, includes a recurrent network of stacked Long Short-Term Memory (LSTM) layers. For instance the encoder reads a sequence of d-dimensional feature vectors (e.g., acoustic frames 110 (FIG. 1)) vectors $x=(x_1, x_2, \ldots, x_T)$, where $x_t \in \mathbb{R}^d$, and produces at each time step a higher-order feature representation. This higher-order feature representation is denoted as $h_1^{enc}, \ldots, h_T^{enc}$.

Similarly, the prediction network 320 is also an LSTM network, which, like a language model (LM), processes the sequence of non-blank symbols output by a final Softmax layer 340 so far, $y_0, \ldots, y_{ui-1}$, into a dense representation $h_{u_i}^{dec}$. Finally, with the RNN-T model architecture, the representations produced by the encoder and prediction networks 310, 320 are combined by the joint network 330. The joint network then predicts $P(y_i|x_1, \ldots, x_{t_i}, y_0, \ldots, y_{ui-1})$, which is a distribution over the next output symbol. The Softmax layer 340 may employ any technique to select the output symbol with the highest probability in the distribution as the next output symbol predicted by the model 300. In this manner, the multilingual RNN-T model 300 does not make a conditional independence assumption, rather the prediction of each symbol is conditioned not only on the acoustics but also on the sequence of labels output so far. The multilingual RNN-T model 300 does assume an output symbol is independent of future acoustic frames 110, which allows a multilingual RNN-T model to be employed in a streaming fashion.

In some examples, the encoder network 310 of the multilingual RNN-T model 300 is made up of eight 2,048-dimensional LSTM layers, each followed by a 640-dimensional projection layer. The prediction network 320 may have two 2,048-dimensional LSTM layers, each of which is also followed by 640-dimensional projection layer. Finally, the joint network 330 may also have 640 hidden units. The softmax layer may be composed of a unified grapheme set from all languages, i.e., 988 graphemes in total, that is generated using all unique graphemes in a plurality of training data sets 202 (FIG. 2).

As opposed to most state-of-the-art multilingual models that require the encoding of language information with audio inputs during training, implementations herein are directed toward the multilingual E2E ASR model 300 being language-agnostic such that no language information (e.g., embedding, vectors, tags, etc.) is provided with the input acoustic frames 110 to identify the language(s) associated with the input acoustic frames 110. Moreover, and discussed in greater detail below, the multi-lingual E2E ASR model 300 is not conditioned on any language information during training such that the model 300 is configured to receive training audio in any natural language and learn to predict speech recognition results 120 in a target script for the audio that match a corresponding reference transcription in the same target script independent of the respective natural language associated with the audio. As will become apparent, training the multilingual E2E ASR model 300 to be language-agnostic, permits all parameters of the model to be shared across all natural languages representing the input acoustic frames 110. Not only does this data and parameter sharing by the model improve computational costs, improve latency, and reduce memory constraints of the model 300, the model 300 is also able to provide benefits for data-scarce languages and enable training of the model 300 on new or different languages at any time, thereby providing a scalable and uniform model for multilingual speech recognition in a multitude of different multicultural societies where several languages are frequency used together (but often rendered with different writing systems). That is, by not depending on language information limits, the language-agnostic multilingual E2E ASR model 300 can be extended to newer languages and be adaptable to accepting codemixed utterances spoken in languages used during training.

Moreover, for Indic languages, code-switching in conversation provides additional challenges due to a considerable amount of variability in the usage of a second language (e.g., typically English) alongside native languages such as Tamil, Bengali, or Hindi. As a result, it is difficult to model context under which code switching occurs, and the language to which a spoken word should be assigned. This problem is further compounded by inconsistent transcriptions and text normalization. While Indic languages often overlap in acoustic and lexical content due to their language family relations and/or the geographic and cultural proximity of the native speakers, the respective writing systems occupy different Unicode blocks that result in inconsistent transcriptions. That is, a common word, workpiece, or phoneme can be realized with multiple variants in the native language writing systems, leading to increased confusions and inefficiency in data sharing when training the model 300.

Figure 2:
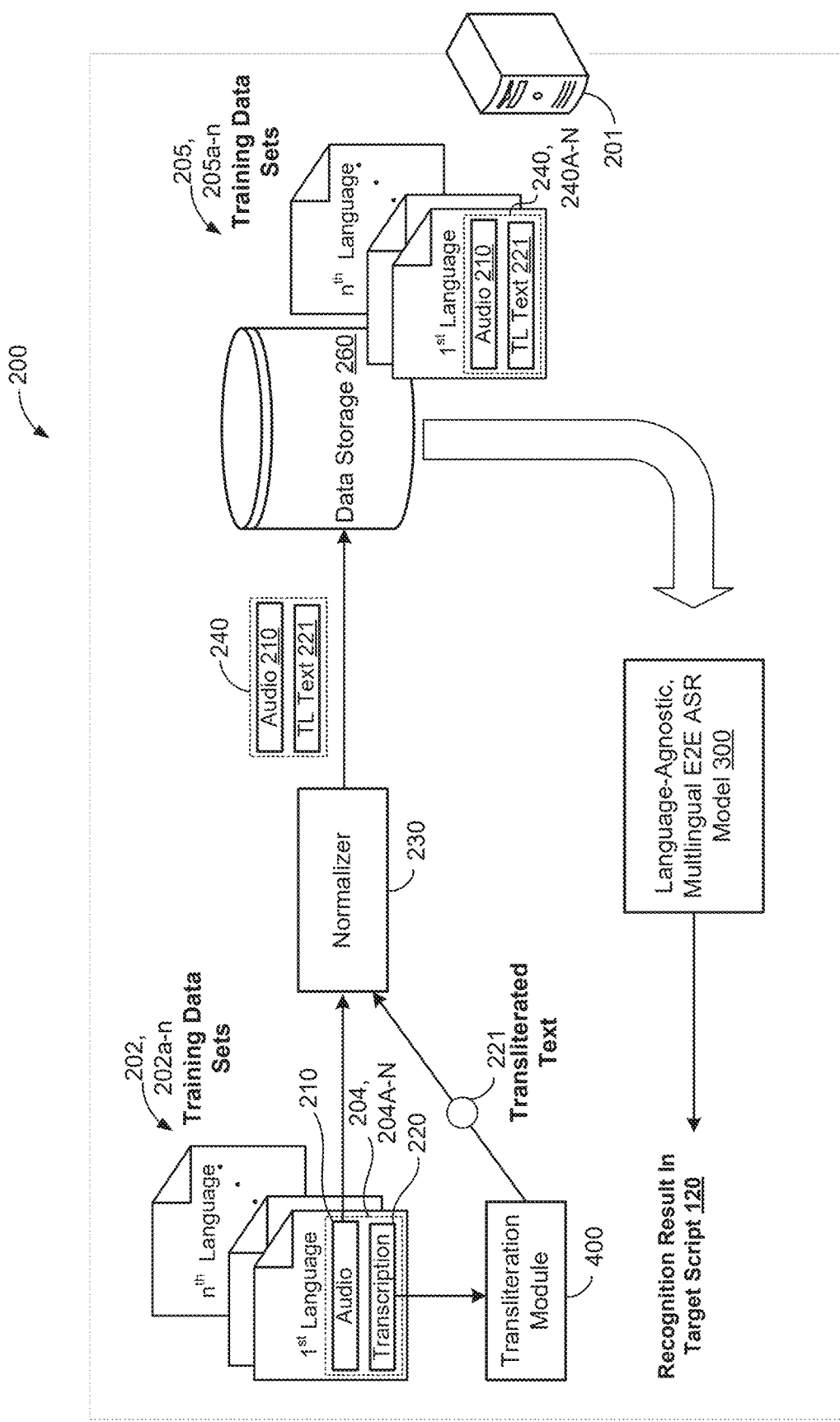
FIG. 2 is an example training process for training the multilingual speech recognition system of FIG. 1.

Referring to FIG. 2, an example training process 200 for building/training the language-agnostic, multilingual E2E ASR model 300 includes transforming all languages used to train the model into one writing system (e.g., a target script) through a many-to-one transliteration module 400. By transliterating into one common writing system, the ASR model 300 will be able to map similar sounding acoustics to a single, canonical target sequence of graphemes, effectively separating modeling and rendering problems over traditional language-dependent multilingual models. As used herein, transliteration refers to a sequence-to-sequence mapping problem that aims to convert text/script from one writing system to another A computing device 201, such as a remote server executing on a distributed system in a cloud computing environment, may execute the training process 200 and later push the trained language-agnostic, multilingual E2E ASR model 300 to user devices 102 for generating speech recognition results on-device. Additionally or alternatively, the trained model 300 may execute on the computing device 201 for generating speech recognition results 120 in the target script based on acoustic frames 110 received from user devices 102.

The training process 200 obtains a plurality of training data sets 202, 202a-n each associated with a respective native language that is different than the respective native languages of the other training data sets 202. Here, each training data set 202 includes a plurality of respective training data samples 204, 204a-n, whereby each training sample 204 includes audio 210 (e.g., an audible utterance) spoken in the respective native language and a corresponding transcription 220 of the audio 210 in a respective native script representing the respective native language.

For each respective training data sample 204 of each training data set 202 in the respective native language, the training process 200 transliterates the corresponding transcription 220 in the respective native script into corresponding transliterated text 221 representing the respective native language of the corresponding audio 210 in a target script. That is, the training process transliterates the native script of the transcriptions in all of the different native languages into the same target script, whereby the target script is associated with a different writing system than the writing systems associated with each of the native scripts. In some examples, the target script includes Latin script representing the Latin writing system. In the example shown, the training process 200 uses a many-to-one transliteration module 400 to transliterate the transcriptions 220 in the native scripts into the corresponding transliterated texts 221 in the target script.

Figure 4:
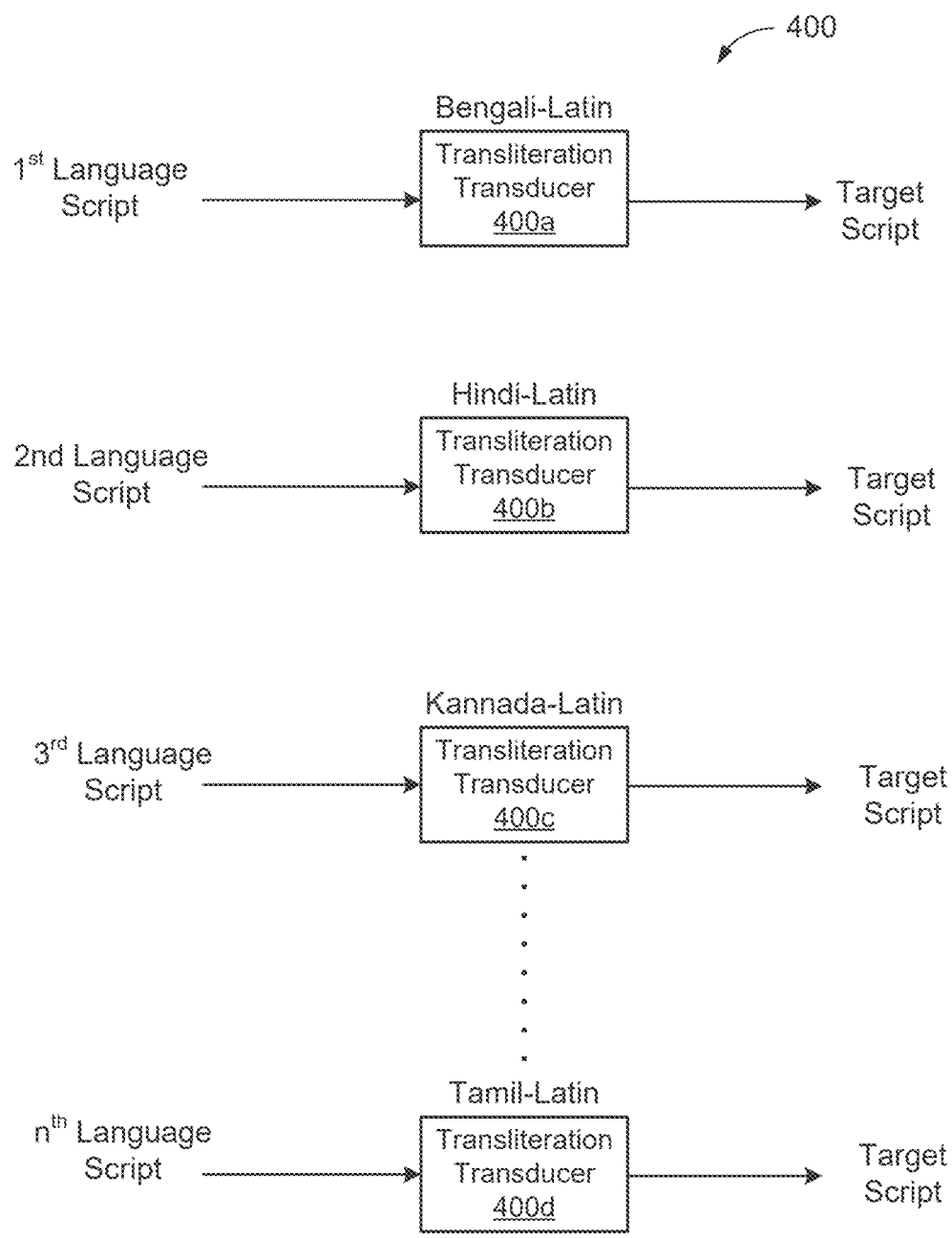
FIG. 4 is a schematic view of example transliteration transducers associated with respective native languages.
Figure 5:
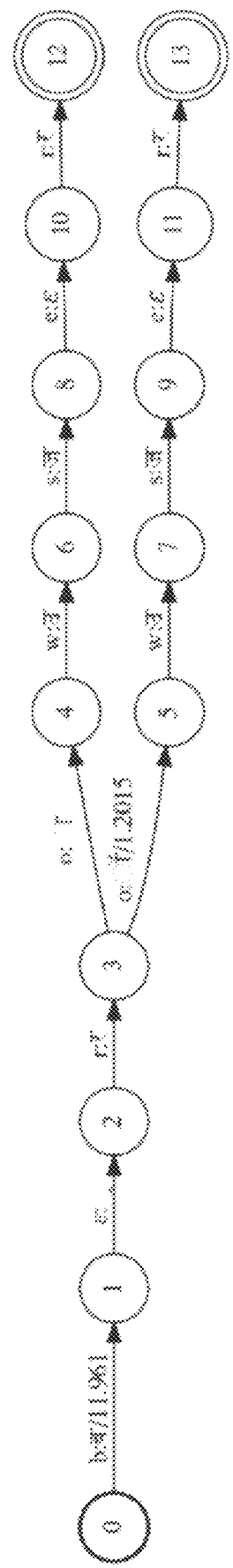
FIG. 5 is a schematic view of a diagram illustrating an example of a finite state transducer network.

Referring to FIGS. 2 and 4, in some implementations, the transliteration module 400 includes multiple transliteration transducers 400, 400a-n each associated with a respective native language for transliterating the respective native script representing the respective native language into the transliterated text 221 in the target script. For instance, FIG. 4 shows each transliteration transducer 400a-n associated with a respective native script and including a composition of three transducers: I∘ P∘O, where I includes an input transducer configured to map Unicode symbols to symbols in a pair language model, P includes a bigram pair language model transducer configured to map between symbols in the respective native script and the target script (e.g., Bengali-Latin; Hindi-Latin; Kannada-Latin; and Tamil-Latin), and O includes an output transducer configured to map the pair language model symbols to the target output symbols of the target script (e.g., Latin). Each pair language model transducer P includes an n-gram model over "pair' symbols having an input Unicode code point paired with an output Unicode code point. Thus, as with grapheme-to-phoneme conversion, given an input lexicon including native script words and Latin script realizations of those words (e.g., known as Romanizations), expectation maximization is used to derive pairwise alignments between symbols in both the native and Latin scripts. FIG. 5 shows an example transliteration transducer transliterating Devanagari writing script into Latin script. The conditional probability of the transliterated word (e.g., Browser) is obtained by dividing a joint probability from the transliteration transducer by a marginalization sum over all input and output sequences. This computation is efficiently implemented by computing a shortest path in the transliteration transducer 400.

As set forth above, the input for training each pair language model transducer P of each transliteration transducer 400 includes respective transliteration pairs formed from native script words and possible Latin script Romanizations. As used herein, a "transliteration pair" (interchangeably referred to as a "transliterated pair" or "a native-transliterated word pair") refers to a word in a native language script (e.g., a respective one of Bengali, Hindi, Kannada; or Tamil) paired with a corresponding spelling of the word in the target script (e.g., Latin script Romanization). However, the possible Latin script romanizations can result in the spelling of words in a variety of different ways since there is no standard orthography in the Latin script. Table 1 shows native script spellings of the English word "discovery" in each of the four Indic languages of Bengali, Hindi, Kannada, and Tamil with attested Romanizations of that word in transducer training data.

TABLE 1

| Bengali | Hindi | Kannada | Tamil |
| ডিসকভারি | डिस्कवरी | ಡಿಸ್ಕವರಿ | டிஸ்கவரி |
| --- | --- | --- | --- |
| discoveri | discovery | discovary | tiskavari |
| discovery | | discovery | discovery |
| diskovary | | discoveri | |
| diskovery | | discowery | |
| diskoveri | | | |

Table 1 shows that while the actual spelling of the word in English is attested in all four of the Indic native languages, annotators in each language may vary in the number and kind of Romanization they suggest. This variance by the annotators may be driven by many factors, including differences in pronunciation or simply individual variation. Unfortunately, spelling inconsistency across languages in transliterated text 221 creates confusion and diminishes the intended sharing of knowledge across languages when training the multilingual ASR model 300 with the transliterated text 221. To mitigate these inconsistencies where the transliteration transducer transliterates multiple different target script spellings for a same word, an agreement-based data pre-processing technique or a frequency-based data pre-processing technique can be employed.

In agreement-based data pre-processing, each transliteration transducer 400 associated with a respective native language is configured to only process transliteration pairs which have at least one common spelling in the target script of the transliterated text 221. For instance, in the above example where the target script spelling of "Discovery" is common across each of the four Indic languages of Bengali, Hindi, Kannada, and Tamil, the transliteration transducers 400 associated with each of the four Indic languages may be trained to only process the target script with the spelling "Discovery" while leaving all other spellings unprocessed. That is, in agreement-based pre-processing, the transliteration transducer 400a for transliterating Bengali to Latin is trained to only process the target script spelling "Discovery" without processing the other possible spellings of "discoveri", "diskovary", "diskovery", and "diskoveri". Table 2 below provides an example algorithm for training the transliteration transducers 400 on the agreement-based pre-processing technique.

TABLE 2

Algorithm 1 Agreement-based pre-processing

HiWords: Mapping from native Hindi words to Latin transliterated forms;
BnWords: Mapping from native Bengali words to Latin transliterated forms;
TaWords: Mapping from native Tamil words to Latin transliterated forms;
KnWords: Mapping from native Kannada words to Latin transliterated forms;
common_latin ← Latin(HiWords) ∩ Latin(BnWords) ∩ Latin(TaWords) ∩ Latin(KnWords)
for all mapping in {HiWords, BnWords, TaWords, KnWords} do
  for all native_word in Native(mapping) do
    agreed_latin ← mapping[native_word] ∩ common_latin
    if agreed_latin ≠ ∅ then
      mapping[native_word] ← agreed_latin
    end if
  end for
end for In addition to the native-transliterate word pair, the training data also contains a frequency of occurrences of all transliterated forms for a word in the respective native script. By utilizing these frequencies of occurrence, the frequency-based data pre-processing technique transforms all of the transliteration pairs for each language. Moreover, the frequency-based data pre-processing may also rely on an empirical observation that the most frequent transliterated pairs formed usually correlated to commonly used spellings of proper nouns and/or actual dictionary spellings of the English words. Accordingly, when the training data includes multiple different spellings in the target text of the transliterated text 221 for a given native word, each respective transliteration transducer 400 is configured to only process/retain the target script with spellings that meet a frequency threshold and discard the rest. In some examples, the frequency threshold includes an average transliteration frequency per native word in the training data. Table 3 below provides an example algorithm for training the transliteration transducers 400 on the frequency-based pre-processing technique.

TABLE 3

Algorithm 2 Frequency-based pre-processing

Mappings: For each language, mapping from native words to transliterated forms
for all mapping in Mappings do
  for all native_word in Native(mapping) do
    translits ← mapping[word]
    $avg\_freq \leftarrow \frac{1}{|translits|} * \sum_{t \in translits} Freq(t)$
    mapping[native_word] ← {t|t∈translits, Freq(t) ≥ avg_freq}
  end for
end for Referring back to FIG. 2, in additional implementations, the many-to-one transliteration module 400 includes a language-independent transliteration transducer configured to transliterate each corresponding transcription 220 in each respective native script into the corresponding transliterated text 221 in the target script. As such, separate transliteration transducers 400 each associated with a respective language would not have to be trained individually.

After transliterating the corresponding transcription 220 in the respective native script into corresponding transliterated text 221 representing the respective native language of the corresponding audio 210 in a target script, FIG. 2 shows the training process 200 associating the corresponding transliterated text 221 in the target script with the corresponding audio 210 in the respective native language to generate a respective normalized training data sample 240. Here, a normalizer 230 receives the audio 210 spoken in the respective native language from the respective training data sample 204 and the corresponding transliterated text 221 output from the transliteration module 400 to generate the respective normalized training data sample 240. While the example shows the transliterated text 221 in the target script replacing the corresponding transcription 220 in the respective native script, the normalized training data sample 240 may also include the transcription 220 in addition to the corresponding audio 210 and the transliterated text 221. Thereafter, data storage 260 (e.g., residing on memory hardware of the computing system 201) may store normalized training sets 205, 205a-n corresponding to respective ones of the received training data sets 202, 202a-n. That is, each normalized training set 205 includes a plurality of respective normalized training samples 240, 240a-n, whereby each respective normalized training sample 240 includes the audio 210 (e.g., an audible utterance) spoken in the respective native language and the corresponding transliterated text 221 representing the respective native language of the audio 210 in the target scrip.

In the example shown, the training process 200 trains, using the normalized training data samples 240 generated from each respective training data sample 204 of each training data set 202 and without providing any language information, the multilingual E2E ASR model 300 to predict speech recognition results 120 in the target script (e.g., Latin) for corresponding speech utterances 106 spoken in any of the different native languages (e.g., the Indic languages of Bengali, Hindi, Kannada, and Tamil) associated with the plurality of training data sets 202. As set forth above, the model 300 is trained without being conditioned on any language information associated with the normalized training data samples 240 provided as input such that the model 300 is agnostic to the natural languages of the audio 210 provided as input. In some examples, training the multilingual E2E ASR model 300 includes shuffling the normalized training data samples 240 such that a sequence of normalized training data samples 240 received as training inputs includes randomly selected audio 210 in any combination and order of natural languages. In doing so, multilingual training of the model 300 may be optimized so that the model 300 does not learn to apply weights favoring one particular language at a time as in the case if the model were trained by grouping the normalized training data samples 240 according to their respective native languages.

Training of the multilingual E2E ASR model 300 generally includes using a stochastic optimization algorithm, such as stochastic gradient decent, to train a neural network architecture of the model 300 through backpropagation. Here, the stochastic optimization algorithm defines a loss function (e.g., a cross-entropy loss function) based on a difference between actual outputs (e.g., recognition results 120 in the target script) of the neural network and desired outputs (e.g., the transliterated text 221 representing the respective native language of the audio 210 in the target scrip). For instance, the loss function is computed for a batch of training examples, and then differentiated with respect to each weight in the model 300.

Moreover, the training process 200 takes into account data imbalance across the plurality of data sets 202. Data imbalance is a natural consequence of the varied distribution of speakers across the world's languages. Languages with more speakers tend to produce transcribed data more easily. While some ASR systems may only train the AM on transcribed speech data, all components in a multilingual E2E model are trained on transcribed speech data. As a result, multilingual E2E models may be more sensitive to data imbalance. That is, the multilingual E2E ASR model 300 tends to be more influenced by over-represented native languages in the training data sets 202. The magnitude of over influence is more pronounced in the instant case when no language information/identifier is provided (e.g., no language identifiers encoded with the training audio or language models incorporated).

In some implementations, to address data imbalance across the plurality of data sets 202, the training process first augments the plurality of training data sets 202 with diverse noise styles. In these implementations, the degree of data augmentation for each language is determined empirically by observing a count of noisy copies in the training data set 202 associated with lowest-resource language (e.g., Kannada) that causes the model 300 to degrade in performance. Based on the count of noisy copies, the training data sets 202 associated with the remaining native languages are augmented with a target number of noise styles to result in equal amounts of data for each of the native languages used for training the model 300.

Figure 6:
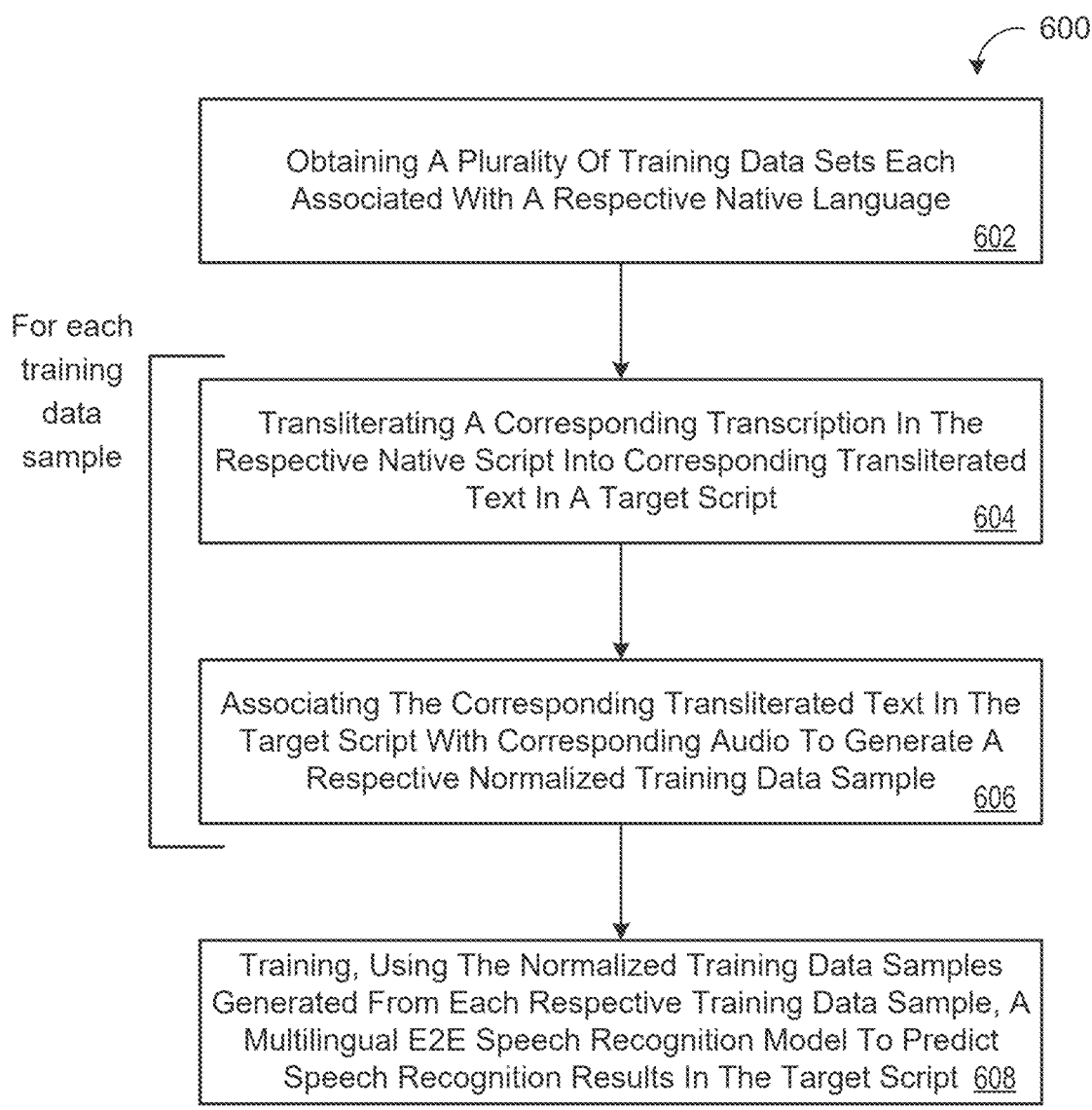
FIG. 6 is a flowchart of an example arrangement of operations for a method of training a language-agnostic, end-to-end speech recognition model.

FIG. 6 provides a flowchart of an example arrangement of operations for a method 600 of training a language-agnostic, multilingual E2E ASR model 300. At operation 602, the method 600 includes obtaining a plurality of training data sets 202 each associated with a respective native language that is different than the respective native languages associated with the other training data sets 202. Here, each training data set 202 includes a plurality of respective training data samples 204 that each include audio 210 spoken in the respective native language and a corresponding transcription 220 of the audio in a respective native script representing the respective native language.

For each respective training data sample 204 of each training data set in the respective native language, the method 600 includes, at operation 604, transliterating the corresponding transcription 220 in the respective native script into corresponding transliterated text 221. Here the transliterated text 221 represents the respective native language of the corresponding audio 210 in a target script. Thereafter, for each respective training data sample 204 of each training data set 202 in the respective native language, the method 600 includes, at operation 606, associating the corresponding transliterated text 221 in the target script with the corresponding audio 210 in the respective native language to generate a respective normalized training data sample 240. Here, the respective normalized training data sample 240 includes the audio 210 spoken in the respective native language and the corresponding transliterated text 221 in the target script.

At operation 608, the method 600 includes training, using the normalized training data samples generated from each respective training data sample of each training data set and without providing any language information, the multilingual E2E ASR model 300 to predict speech recognition results 120 in the target script for corresponding speech utterances 106 spoken in any of the different native languages associated with the plurality of training data sets 202. Training the model 300 may include using a stochastic optimization algorithm, such as stochastic gradient decent.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
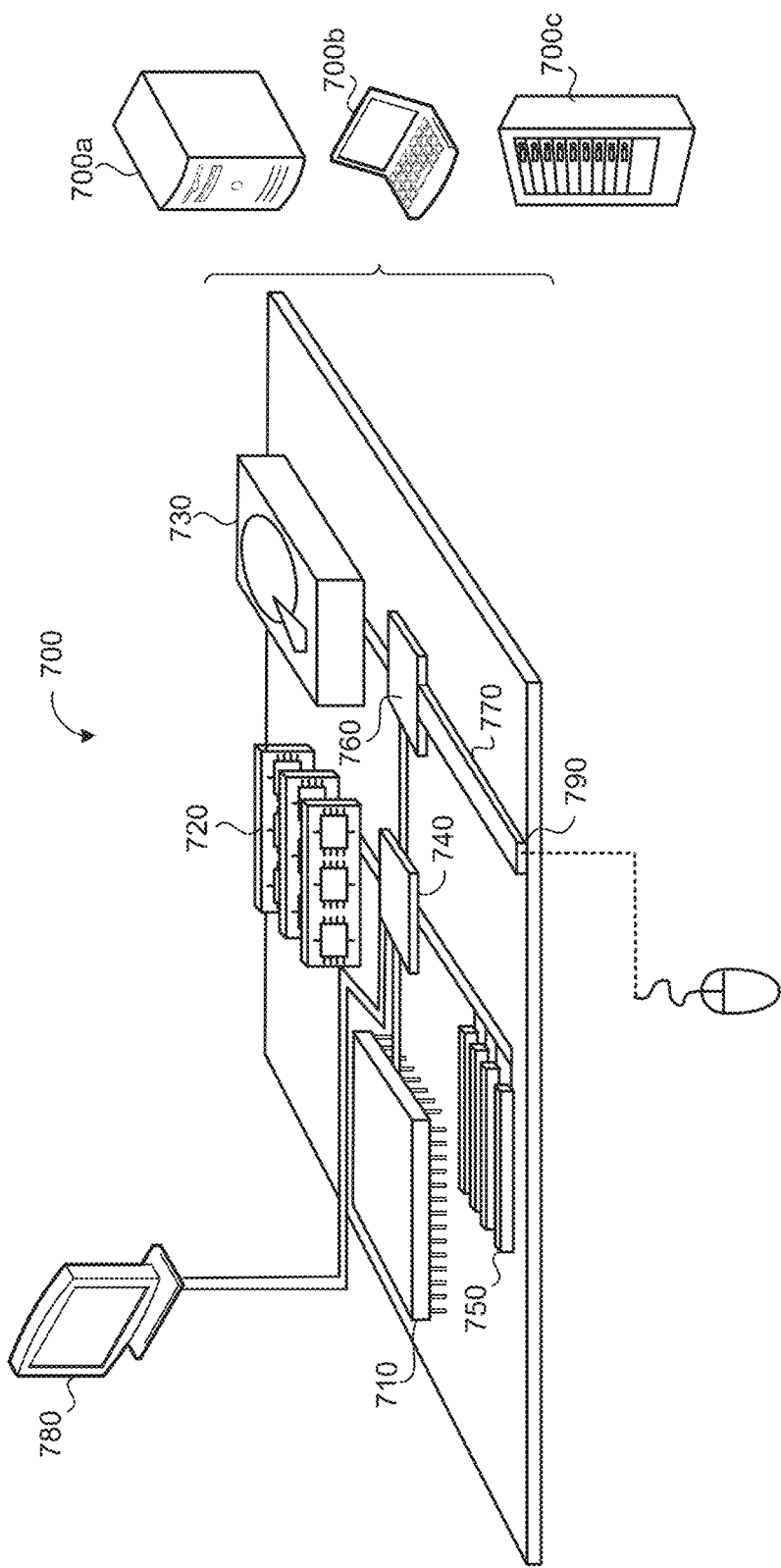
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:
obtaining a plurality of training data sets each associated with a respective native language that is different than the respective native language of the other training data sets, each training data set comprising a plurality of respective training data samples, each training data sample comprising training audio spoken in the respective native language and a corresponding transcription of the training audio in a respective native script representing the respective native language; and
for each respective training data sample of each training data set:
augmenting the corresponding training audio of the respective training data sample to create one or more copies of the corresponding training audio with diverse noise styles;
transliterating the corresponding transcription in the respective native script into corresponding transliterated text representing the respective native language of the corresponding training audio into a corresponding transliterated script different than the respective native script; and
based on the corresponding training audio, the one or more copies of the corresponding audio with diverse noise styles, and the corresponding transliterated text, training a multilingual speech recognition model to predict speech recognition results in the corresponding transliterated script for corresponding speech utterances spoken in the respective native language of the respective training data sample.

2. The computer-implemented method of claim 1, wherein training the multilingual speech recognition model comprises training an end-to-end multilingual speech recognition without providing any language information.

3. The computer-implemented method of claim 1, wherein transliterating the corresponding transcription in the respective native script comprises using a finite state transducer (FST) network to transliterate the corresponding transcription in the respective native script into the corresponding transliterated text.

4. The computer-implemented method of claim 1, wherein transliterating the corresponding transcription in the respective native script into the corresponding transliterated text comprises using a respective transliteration transducer associated with the respective native script to transliterate the corresponding transcription in the respective native script into the corresponding transliterated text.

5. The computer-implemented method of claim 4, wherein the transliteration transducer associated with the respective native script comprises:
an input transducer configured to input Unicode symbols in the respective native script to symbols in a pair language model;
a bigram pair language model transducer configured to map between symbols in the respective native script and the corresponding transliterated script; and
an output transducer configured to map the symbols in the pair language model to output symbols in the corresponding transliterated script.

6. The computer-implemented method of claim 4, wherein the operations further comprise, prior to transliterating the corresponding transcription in the respective native language, training, using agreement-based data pre-processing, each respective transliteration transducer to only process transliteration pairs that have at least one spelling in the corresponding transliterated script of the transliterated text for a given native word that is common across each of the respective native languages associated with the training data sets.

7. The computer-implemented method of claim 4, wherein the operations further comprise, prior to transliterating the corresponding transcription in the respective native language, training, using frequency-based data pre-processing, each respective transliteration transducer to only process transliteration pairs that have spellings in the corresponding transliterated script of the transliterated text for a given native word that satisfy a frequency threshold.

8. The computer-implemented method of claim 1, wherein transliterating the corresponding transcription in the respective native script into the corresponding transliterated text comprises using a language-independent transliteration transducer to transliterate the corresponding transcription in the respective native script into the corresponding transliterated text.

9. The computer-implemented method of claim 1, wherein the multilingual speech recognition model comprises a sequence-to-sequence neural network.

10. The computer-implemented method of claim 1, wherein training the multilingual speech recognition model comprises using a stochastic optimization algorithm to train the multilingual speech recognition model.

11. A system comprising:
data processing hardware; and
memory hardware in communication with the data processing hardware, the memory hardware storing instructions that when executed on the data processing hardware cause the data processing hardware to perform operations comprising:
obtaining a plurality of training data sets each associated with a respective native language that is different than the respective native language of the other training data sets, each training data set comprising a plurality of respective training data samples, each training data sample comprising training audio spoken in the respective native language and a corresponding transcription of the training audio in a respective native script representing the respective native language; and
for each respective training data sample of each training data set:
augmenting the corresponding training audio of the respective training data sample to create one or more copies of the corresponding training audio with diverse noise styles;
transliterating the corresponding transcription in the respective native script into corresponding transliterated text representing the respective native language of the corresponding training audio into a corresponding transliterated script different than the respective native script; and
based on the corresponding training audio, the one or more copies of the corresponding audio with diverse noise styles, and the corresponding transliterated text, training a multilingual speech recognition model to predict speech recognition results in the corresponding transliterated script for corresponding speech utterances spoken in the respective native language of the respective training data sample.

12. The system of claim 11, wherein training the multilingual speech recognition model comprises training an end-to-end multilingual speech recognition without providing any language information.

13. The system of claim 11, wherein transliterating the corresponding transcription in the respective native script comprises using a finite state transducer (FST) network to transliterate the corresponding transcription in the respective native script into the corresponding transliterated text.

14. The system of claim 11, wherein transliterating the corresponding transcription in the respective native script into the corresponding transliterated text comprises using a respective transliteration transducer associated with the respective native script to transliterate the corresponding transcription in the respective native script into the corresponding transliterated text.

15. The system of claim 14, wherein the transliteration transducer associated with the respective native script comprises:
    an input transducer configured to input Unicode symbols in the respective native script to symbols in a pair language model;
    a bigram pair language model transducer configured to map between symbols in the respective native script and the corresponding transliterated script; and
    an output transducer configured to map the symbols in the pair language model to output symbols in the corresponding transliterated script.

16. The system of claim 14, wherein the operations further comprise, prior to transliterating the corresponding transcription in the respective native language, training, using agreement-based data pre-processing, each respective transliteration transducer to only process transliteration pairs that have at least one spelling in the corresponding transliterated script of the transliterated text for a given native word that is common across each of the respective native languages associated with the training data sets.

17. The system of claim 14, wherein the operations further comprise, prior to transliterating the corresponding transcription in the respective native language, training, using frequency-based data pre-processing, each respective transliteration transducer to only process transliteration pairs that have spellings in the corresponding transliterated script of the transliterated text for a given native word that satisfy a frequency threshold.

18. The system of claim 11, wherein transliterating the corresponding transcription in the respective native script into the corresponding transliterated text comprises using a language-independent transliteration transducer to transliterate the corresponding transcription in the respective native script into the corresponding transliterated text.

19. The system of claim 11, wherein the multilingual speech recognition model comprises a sequence-to-sequence neural network.

20. The system of claim 11, wherein training the multilingual speech recognition model comprises using a stochastic optimization algorithm to train the multilingual speech recognition model.

* * * * *